US009141109B1

(12) United States Patent
Kamata

(10) Patent No.: US 9,141,109 B1
(45) Date of Patent: Sep. 22, 2015

(54) AUTOMATED DRIVING SAFETY SYSTEM

(71) Applicant: Toyota Motor Engineering & Manufacturing North America, Inc., Erlanger, KY (US)

(72) Inventor: Nobuhide Kamata, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/271,318

(22) Filed: May 6, 2014

(51) Int. Cl.
*G05D 22/00* (2006.01)
*G05D 1/00* (2006.01)
*G08B 21/02* (2006.01)

(52) U.S. Cl.
CPC ............ *G05D 1/0077* (2013.01); *G05D 1/0061* (2013.01); *G08B 21/02* (2013.01)

(58) Field of Classification Search
CPC ...... G01C 21/165; G01C 21/26; G01S 19/48; G01S 19/39; G06K 9/00798; G06K 9/00785; G06F 19/00; G06F 7/00; G05D 1/00; B60W 30/12; B60W 50/04; B62D 15/025
USPC ............ 701/436, 455, 23, 41, 42; 340/995.25
See application file for complete search history.

(56) References Cited

U.S. PATENT DOCUMENTS

| | | | | |
|---|---|---|---|---|
| 5,419,293 | A | 5/1995 | Nagai | |
| 5,629,669 | A | 5/1997 | Asano et al. | |
| 7,292,940 | B2 | 11/2007 | Isogai et al. | |
| 2012/0323690 | A1* | 12/2012 | Michael | 705/14.58 |
| 2013/0046431 | A1 | 2/2013 | Becker et al. | |
| 2013/0297387 | A1* | 11/2013 | Michael | 705/13 |
| 2013/0304374 | A1* | 11/2013 | Lee et al. | 701/445 |
| 2014/0148988 | A1* | 5/2014 | Lathrop et al. | 701/23 |
| 2014/0172727 | A1* | 6/2014 | Abhyanker et al. | 705/307 |
| 2014/0256426 | A1* | 9/2014 | Bavitz et al. | 463/29 |
| 2014/0343851 | A1* | 11/2014 | Michael | 701/538 |
| 2015/0025731 | A1* | 1/2015 | Uehara | 701/23 |

FOREIGN PATENT DOCUMENTS

| | | |
|---|---|---|
| JP | 2010-173601 | 8/2010 |

* cited by examiner

*Primary Examiner* — McDieunel Marc
(74) *Attorney, Agent, or Firm* — Christopher G. Darrow; Darrow Mustafa PC

(57) ABSTRACT

A system, device, and methods of automated driving. One example method includes determining a planned vehicle path using a path planner application receiving information based on inputs to one or more sensors disposed on a vehicle. The method further includes sending a command to one or more vehicle systems to control the vehicle to follow the planned vehicle path. While the vehicle follows the planned vehicle path, the method includes receiving an indication that the path planner application is not meeting a threshold performance level. After receiving the indication that the path planner application is not meeting the threshold performance level, the method further includes resending the previously sent command to the one or more vehicle systems to control the vehicle to follow the planned vehicle path.

20 Claims, 3 Drawing Sheets

300
302
304
306
308
310
312
314
316
318
320
322
324
200

400
402
404
406
408
410
412
414
416
418
420
422
424
426
428
430
200

AUTOMATED DRIVING SAFETY SYSTEM

BACKGROUND

Partially-automated or monitored driving systems are designed to assist drivers in operating a vehicle safely and efficiently on the road, for example, using techniques such as eye-tracking of the driver to send a warning when the driver becomes inattentive, lane tracking of the vehicle to send a warning to the driver when the vehicle is leaving its lane, and controlling vehicle velocity based on distance to a vehicle ahead of the driver when adaptive cruise control is activated by the driver. Fully or highly automated driving systems are designed to operate a vehicle on the road either without or with low levels of driver interaction or other external control, for example, self-driving vehicles.

SUMMARY

An automated driving system can be described as a system that can operate a vehicle on the road without driver interaction. The automated driving system described here can autonomously operate the vehicle to follow a planned vehicle path that accounts for both a navigation route of the vehicle and information specific to the environment surrounding the vehicle, such as lane structure along the road and nearby obstacles. If the automated driving system receives an indication that the application determining the planned vehicle path, e.g. the path planner, is not performing to at least a threshold performance level, the automated driving system can be configured to resend a previous command from the path planner to one or more vehicle systems to maneuver the vehicle along a trajectory close to the originally planned vehicle path for at least enough time to allow other vehicle safety systems or the driver to intervene and take over partially automated or manual operation of the vehicle.

In one implementation, an automated driving system is disclosed. The system includes one or more sensors disposed on a vehicle and a computing device in communication with the one or more sensors. The computing device includes one or more processors for controlling the operations of the computing device and a memory for storing data and program instructions used by the one or more processors. The one or more processors are configured to execute instructions stored in the memory to: determine, using a path planner application receiving information based on inputs to the one or more sensors, a planned vehicle path; send a command to one or more vehicle systems to control the vehicle to follow the planned vehicle path; while the vehicle follows the planned vehicle path, receive an indication that the path planner application is not meeting a threshold performance level; and after receiving the indication that the path planner application is not meeting the threshold performance level, resend the command to the one or more vehicle systems to control the vehicle to follow the planned vehicle path.

In another implementation, a computer-implemented method of automated driving is disclosed. The method includes determining, using a path planner application receiving information based on inputs to one or more sensors disposed on a vehicle, a planned vehicle path; sending a command to one or more vehicle systems to control the vehicle to follow the planned vehicle path; while the vehicle follows the planned vehicle path, receiving an indication that the path planner application is not meeting a threshold performance level; and after receiving the indication that the path planner application is not meeting the threshold performance level, resending the command to the one or more vehicle systems to control the vehicle to follow the planned vehicle path.

In another implementation, a computing device is disclosed. The computing device includes one or more processors for controlling the operations of the computing device and a memory for storing data and program instructions used by the one or more processors. The one or more processors are configured to execute instructions stored in the memory to: determine, using a path planner application receiving information based on inputs to one or more sensors disposed on a vehicle, a planned vehicle path; send a command to one or more vehicle systems to control the vehicle to follow the planned vehicle path; while the vehicle follows the planned vehicle path, receive an indication that the path planner application is not meeting a threshold performance level; and after receiving the indication that the path planner application is not meeting the threshold performance level, resend the command to the one or more vehicle systems to control the vehicle to follow the planned vehicle path.

BRIEF DESCRIPTION OF THE DRAWINGS

The description herein makes reference to the accompanying drawings wherein like reference numerals refer to like parts throughout the several views, and wherein.

DETAILED DESCRIPTION

An automated driving system for a vehicle is disclosed. The automated driving system can be configured to determine a planned vehicle path using a path planner application and send commands, for example, through a vehicle controller, to various vehicle systems to control the vehicle to follow the planned vehicle path. If an indication is received that the path planner application is not meeting a threshold performance level, the automated driving system can be configured to resend the planned vehicle path from the path planner application to the vehicle controller in order to control the vehicle to continue to follow the planned vehicle path, which can include maintaining vehicle velocity. The automated driving system can also be configured to send a notification to a driver of the vehicle to take control of the vehicle if the path planner application is not meeting the threshold performance level. These safety features improve the overall operation of the automated driving system as compared to prior art autonomous systems that cancel operation of the automated driving system if the path planner application does not meet a threshold performance level.

Figure 1:
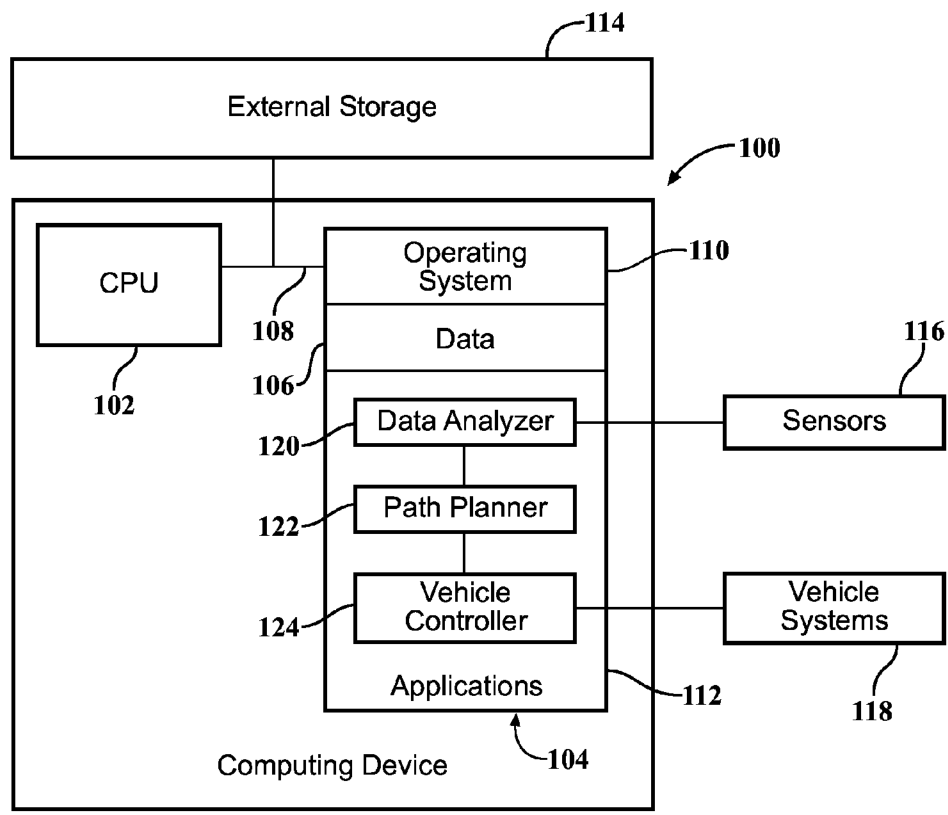
FIG. 1 is a block diagram of a computing device for implementing an automated driving system.

FIG. 1 is a block diagram of a computing device 100 for implementing the automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with one or more sensors 116. The sensors 116 can capture data and/or signals for processing by an inertial measurement unit (IMU), a lane-keeping assist (LKA) system, a dead-reckoning system, an adaptive cruise control (ACC) system, a global navigation satellite system (GNSS), a light detection and ranging (LIDAR) system, a radar system, a sonar system, an image-based sensor system, or any other type of system capable of capturing information specific to the environment surrounding a vehicle, including information specific to objects such as other vehicles proximate to the navigation route of the vehicle, pedestrians, features of the route being travelled by the vehicle, or other localized position data and/or signals and outputting corresponding data and/or signals to the CPU 102.

The sensors 116 can also capture data representative of changes in x, y, and z-axis position, velocity, acceleration, rotation angle, and rotational angular rate for the vehicle and similar data for objects proximate to the navigation route of the vehicle. If the sensors 116 capture data for a dead-reckoning system, data relating to wheel revolution speeds, travel distance, steering angle, and steering angular rate of change can be captured. If the sensors 116 capture signals for a GNSS, a receiver can calculate vehicle position and velocity estimated in global coordinates. A plurality of satellites can be used to estimate the vehicle's position and velocity using three-dimensional triangulation and time estimation.

If the sensors 116 capture data for a LIDAR system, ranging data relating to intensity or reflectivity returns of the environment surrounding the vehicle can be captured. In the examples described below, the sensors 116 can capture, at least: data for a dead-reckoning system, ACC system, or other system that estimates vehicle velocity, acceleration, deceleration, position, and orientation; signals for a GNSS or other system that determines vehicle position and velocity; and data for a LIDAR system, LKA system, or other system that measures vehicle distance from lane lines (e.g., route surface markings or route boundaries), obstacles, objects, or other environmental features including traffic lights and road signs. The computing device 100 can also be in communication with one or more vehicle systems 118, such as vehicle braking systems, vehicle propulsion systems, etc. The vehicle systems 118 can also be in communication with the sensors 116, the sensors 116 being configured to capture data indicative of performance of the vehicle systems 118.

In the example computing device 100 described in FIG. 1, the applications 112 stored in the memory 104 include at least a data analyzer 120, a path planner 122, and a vehicle controller 124. Each of these applications 112 are described in additional detail below. In general, data captured by the sensors 116 can be used by one or more of these applications 112 to understand the environment surrounding the vehicle, plan one or more potential vehicle paths for autonomous operation of the vehicle along a navigation route for the vehicle, improve positional accuracy of the vehicle, and send commands to the various vehicle systems 118 to change the current operating characteristics of the vehicle.

Figure 2:
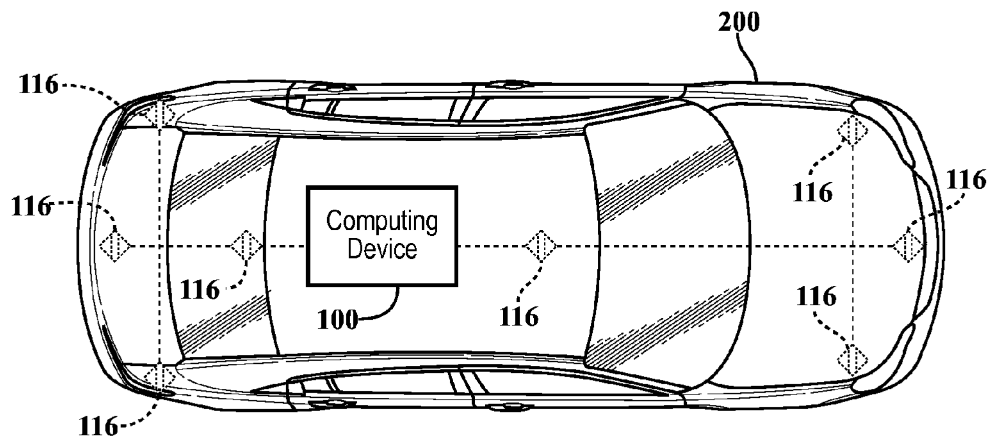
FIG. 2 is a schematic illustration of a vehicle including the computing device of FIG. 1.

FIG. 2 shows a schematic of a vehicle 200 including the computing device 100 described in FIG. 1. The computing device 100 can be located within the vehicle 200 as shown in FIG. 2 or can be located remotely from the vehicle 200 in an alternate location (not shown). If the computing device 100 is located remotely from the vehicle 200, the vehicle 200 can include the capability of communicating with the computing device 100.

The vehicle 200 can also include a plurality of sensors, such as the sensors 116 described in reference to FIG. 1. One or more of the sensors 116 shown can be configured to capture changes in velocity, acceleration, wheel revolution speed, and distance to objects within the surrounding environment for use by the computing device 100 to estimate position and orientation of the vehicle 200, steering angle for a dead-reckoning system, images for processing by an image sensor, vehicle position in global coordinates based on signals from a plurality of satellites, or any other data and/or signals that could be used to determine the current state of the vehicle or determine the position of the vehicle 200 in respect to its environment.

For example, if the sensors 116 are configured to capture data for use by a LIDAR system, the sensors 116 can capture data related to laser returns from physical objects in the area surrounding the vehicle 200 with ranging distances calculated by measuring the time it takes for a signal to return to the sensor 116. Laser returns can include the backscattered light reflected by objects hit by a source of light, e.g. laser light, being emitted by the sensors 116 or another source on or proximate to the vehicle 200. Once the light is reflected by an object, the sensors 116 can capture intensity values and reflectivity of each point on the object to be used for analyzing and classifying the object, for example, by the data analyzer 120, one of the applications 112 stored within or accessible to the computing device 100.

The data analyzer 120 briefly described in FIG. 1 can analyze data and/or signals captured by the one or more sensors 116 by, for example, filtering noise, extracting features for clustering, and/or classifying and tracking objects. The data analyzer 120 can also process data from the one or more sensors 116 such that the data is configured for use by the other various applications 112 used to implement the automated driving system, such as the path planner 122. The path planner 122 can be configured to determine the navigation route for the vehicle 200 to follow based on the vehicle's 200 current location in respect to the surrounding environment as well as any points of destination chosen, for example, by the driver of the vehicle 200. The path planner 122 can thus determine the navigation route for the vehicle 200 based on data received from the data analyzer 120.

The vehicle controller 124 can be configured to send commands to one or more vehicle systems 118 in order to maintain the navigation route indicated by the path planner 122. In one example, the vehicle controller 124 can be a propulsion controller configured to send a command to the engine throttle to move the position of a throttle plate based on the position of an accelerator pedal or a brake pedal. In another example, the vehicle controller 124 can send commands to a traction control system to implement steering changes or a hybrid control system to redistribute a power ratio between electric and gas power sources. As another example, the vehicle controller 124 can be an electronic stability controller configured to send a command to activate one of the front or rear brakes if either more or less yaw motion (rotation around the vehicle's 200 vertical axis) is detected than optimum for the current angle of the steering wheel.

Figure 3:
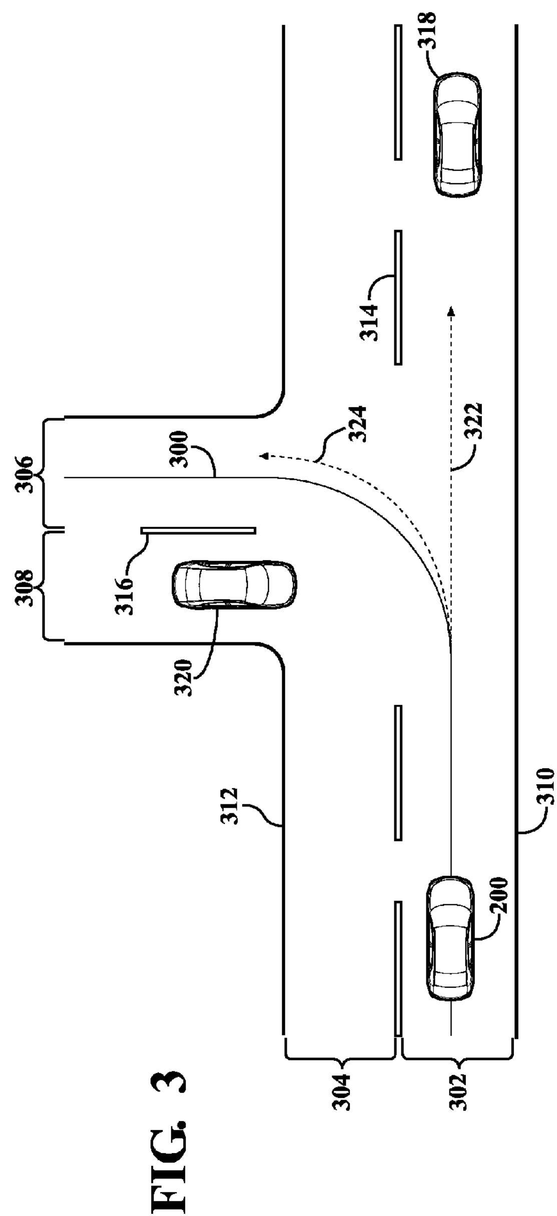
FIG. 3 shows an example portion of a navigation route being traversed by the vehicle of FIG. 2 and an example planned vehicle path along the portion of the navigation route.

FIG. 3 shows an example portion of a navigation route being traversed by the vehicle 200 of FIG. 2 and an example planned vehicle path 300 along the portion of the navigation route. The example navigation route shown in FIG. 3 has the vehicle 200 turning from a first road including two lanes 302, 304 to a second road including two lanes 306, 308 at an intersection. Each of the lanes 302, 304, 306, 308 is formed between lane edge features, such as a curbs 310, 312 and dashed lane markings 314, 316. For example, lane 302 extends between curb 310 and dashed lane marking 314. These lane edge features can be recognized by the path planner 122 using map information corresponding to the location of the vehicle 200 and data captured by the sensors 116 disposed on the vehicle 200 and compared to the map information. The map information can be stored in the memory 104 of the computing device 100 or can be available to the path planner 122 from a remote location.

In the example navigation route of FIG. 3, the data analyzer 120 and path planner 122 can determine that the lanes 302, 304 are designed for vehicular travel in opposite directions as are the lanes 306, 308. The data analyzer 120 and the path planner 122 can also determine that other objects, such as vehicles 318, 320 are proximate to the planned vehicle path 300 along this portion of the navigation route. The data analyzer 120 and the path planner 122 can also use lane information available as part of the map information or as captured by the sensors 116, such as lane edge features, number of lanes, and overall width of the lanes, to determine the planned vehicle path 300 before the vehicle 200 encounters a given portion of the navigation route. The map information, can, for example, be built from data collected using a LIDAR sensor and manipulated using a simultaneous localization and mapping (SLAM) technique to build the map. The map information can also be gathered from a route network definition file (RNDF) or other source. The planned vehicle path 300 can also be determined using a numerical optimization technique.

The path planner 122 calculates the planned vehicle path 300 and can communicate with the vehicle controller 124 such that the vehicle controller 124 can send commands to various vehicle systems 118 to implement the planned vehicle path 300. In order to provide a high level of safety in autonomous operation of the vehicle 200, the calculations made within the path planner 122 can be analyzed to determine whether the path planner 122 meets a threshold performance level. The threshold performance level, can, for example, be based on the calculations performed by the path planner 122 meeting at least a predetermined accuracy score. The accuracy score for the path planner 122 can be measured, for example, by another of the applications 112 in the computing device 100, in order to determine whether the path planner 122 is achieving at least a threshold level of performance as it determines the planned vehicle path 300 and sends commands to the vehicle controller 124.

In one example, the accuracy score of the path planner 122 can be measured based on the time it takes for computations to be completed by the path planner 122. If the time it takes for the path planner 122 to compute the planned vehicle path 300 for the vehicle 200 is longer than a predetermined one-half second threshold, for example, the accuracy score given to the path planner 122 can be low, indicating that the path planner 122 is not meeting the threshold performance level. In another example, the accuracy score of the path planner 122 can be measured based on the distance between the planned vehicle path 300 and a detected obstacle, such as the vehicle 320. If the distance between the planned vehicle path 300 and the detected obstacle, e.g. the vehicle 320, is less, for example, than one meter, the accuracy score given to the path planner 122 can be low, again indicating that the path planner 122 is not meeting the threshold performance level. The threshold performance levels described here, that is, one-half second for time and one meter for distance, are non-limiting examples.

In prior art systems, if a path planner application, such as the path planner 122, was determined to be operating below a threshold performance level, autonomous operation of the vehicle 200 would be halted, and the vehicle controller 114 would either stop receiving instructions from the path planner 122 and/or receive new instructions indicating that the vehicle controller 144 should command various vehicle systems 118 to implement safety protocols to slow the vehicle 200 along its current trajectory. An example of a prior art trajectory of the vehicle 200 after a prior art path planner 122 was determined to be operating below a threshold performance level is shown using projected vehicle path 322 in dotted line. Projected vehicle path 322 shows that the vehicle 200 would continue to move straight within the lane 302 instead of following the planned vehicle path 300 if the path planner 122 was found to operate below a threshold performance level because the steering wheel would return to a neutral position when the vehicle controller 114 stops sending commands to, for example, the steering system. Projected vehicle path 322 is not desirable given that the planned vehicle path 300 along the navigation route shown in FIG. 3 includes a turn from the lane 302 to the lane 306.

In the improved automated driving system described here, if the computing device 100 receives an indication that the path planner 122 is not meeting a threshold performance level, the CPU 102 of the computing device 100 can be configured to resend the most recent planned vehicle path 300 from the path planner 122 to the vehicle controller 124 in order to direct one or more of the vehicle systems 118 to control the vehicle 200 to follow the most recent planned vehicle path 300 for at least a fixed amount of time. In operation, the path planner 122 can have the capacity to predict the required maneuvers of the vehicle 200 for a fixed amount of lead time, for example, one to five seconds, though prediction capability can vary. Given the limits in time of predictive capability, resending the most recent planned vehicle path 300 from the path planner 122 to the vehicle controller 124 in order to control the various vehicle systems 118 once the path planner 122 has been found to be performing under a threshold performance level will result in path similar to projected vehicle path 324. The projected vehicle path 324 allows the vehicle 200 to more closely approximate the original planned vehicle path 300, improving safety of the automated driving system.

In addition to resending the previously planned vehicle path 300 from the path planner 122 to the vehicle controller 124 in order to control the various vehicle systems 118, the CPU 102 of the computing device 100 can be configured to send a notification to a driver of the vehicle 200 to take control of one or more vehicle systems 118 in response to receiving some indication that the path planner 122 is not meeting the threshold performance level. The notification to the driver can be an audible warning, such as a chime, bell, or statement played by an audio system, a tactile warning, such as haptic feedback provided through some portion of the interior of the vehicle 200 to the driver, or a visual warning, such as a textual warning displayed to the driver or a light or sequence of lights displayed to the driver that indicate to the driver that the driver should intervene to take control of one or more vehicle systems 118 from the automated driving system.

As resending the planned vehicle path 300 from the path planner 122 has a limited capability in terms of keeping the vehicle 200 along the previously intended navigation route, the notification to the driver to take over operation of various vehicle systems 118 serves as a safety measure for transition from autonomous operation of the vehicle 200 to manual operation. If the computing device 100 receives an indication that the driver of the vehicle 200 has taken control of the one or more vehicle systems 118 to operate the vehicle 200 in response to receiving the notification that the path planner 122 is not meeting the threshold performance level, the CPU 102 can be configured to disable the automated driving system.

Another safety measure in the improved automated driving system described here can include sending a command to the vehicle controller 124 and the various vehicle systems 118 to control the vehicle 200 according to existing vehicle safety protocols if a threshold amount of time has been reached after sending the notification to the driver of the vehicle 200 to take control, and, for example, no indication has been received that the driver has taken over control of various vehicle systems 118. Vehicle safety protocols can include implementing a lane following system, an obstacle detection system, an adaptive cruise control system, etc. Vehicle safety protocols that allow transition from fully autonomous operation to partially autonomous operation or manual operation of the vehicle 200 are designed to avoid a shutdown of the vehicle 200 as it traverses its navigation route, further improving the safety level associated with the automated driving system.

Figure 4:
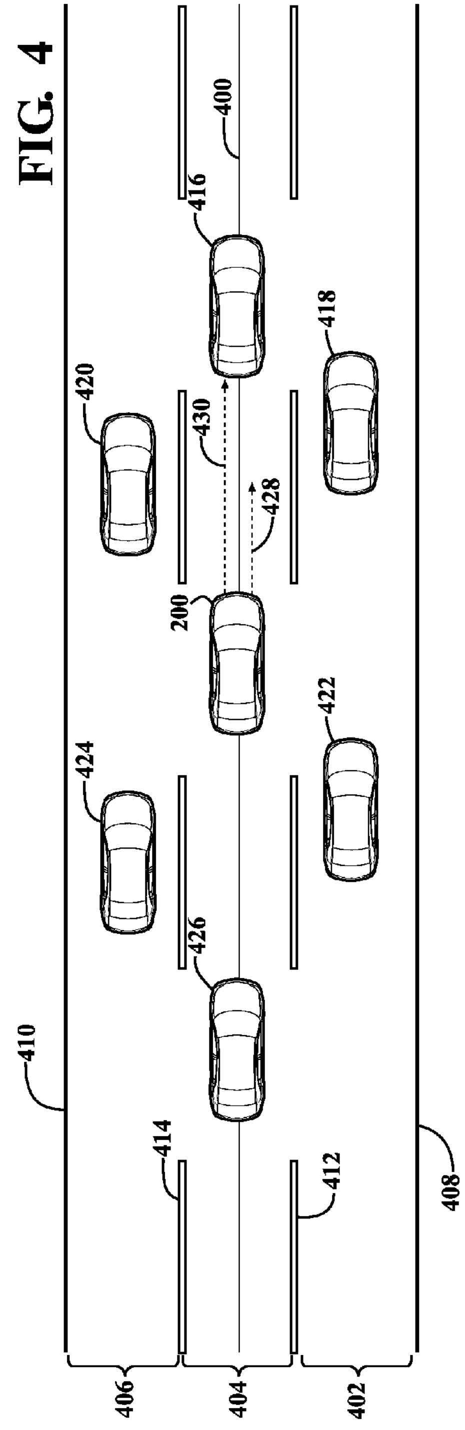
FIG. 4 shows another example portion of the navigation route being traversed by the vehicle of FIG. 2 and another example planned vehicle path along the portion of the navigation route.

FIG. 4 shows another example portion of the navigation route being traversed by the vehicle 200 of FIG. 2 and another example planned vehicle path 400 along the portion of the navigation route. In this example, the automated driving system can be semi-automated in that the path planning capability can be implemented, for example, by an ACC or LKA system serving as the path planner 122. The example navigation route shown in FIG. 4 has the vehicle 200 traveling along a road including three lanes 402, 404, 406. Each of the lanes 402, 404, 406 is formed between lane edge features, such as a curbs 408, 410 and dashed lane markings 412, 414. For example, lane 404 extends between the dashed lane marking 412 and the dashed lane marking 414. In the example navigation route of FIG. 4, the data analyzer 120 and path planner 122 can determine that the lanes 402, 404, 406 are designed for vehicular travel in the same direction. The data analyzer 120 and the path planner 122 can also determine that other objects, such as vehicles 416, 418, 420, 422, 424, 426 are proximate to the planned vehicle path 400 along this portion of the navigation route.

The path planner 122 can communicate with the vehicle controller 124 such that the vehicle controller 124 can send commands to various vehicle systems 118 to implement the planned vehicle path 400. As described above in reference to FIG. 3, the calculations made within the path planner 122 can be analyzed to determine whether the path planner 122 meets a threshold performance level. In the prior art, if the path planner 122 was determined to be operating below a threshold performance level, a trajectory similar to that shown using projected vehicle path 428 in dotted line would be implemented because the path planning capability would be cancelled and the vehicle controller 124 would stop sending commands to the accelerator or decelerator, slowing the vehicle 200. Projected vehicle path 428 shows that the vehicle 200 would continue to move straight within the lane 404, but would also slow to a stop condition instead of following the planned vehicle path 400. Projected vehicle path 428 is not desirable given that the vehicle 200 is operating in heavy traffic, followed, for example, by vehicle 426 within lane 404.

In the improved automated driving system described here, if the computing device 100 receives an indication that the path planner 122 is not meeting a threshold performance level, the CPU 102 of the computing device 100 can be configured to resend the most recent planned vehicle path 400 from the path planner 122 to the vehicle controller 124 in order to direct one or more of the vehicle systems 118 to control the vehicle 200 to follow the original planned vehicle path 400 for at least a fixed amount of time. In the example of FIG. 4, resending the most recent planned vehicle path 400 from the path planner 122 to the vehicle controller 124 in order to command the various vehicle systems 118 will result in a path similar to projected vehicle path 430. The projected vehicle path 430 allows the vehicle 200 to retain its speed and spacing between the other vehicles 416, 426 within the lane 404 for at least some period of time and more closely approximate the original planned vehicle path 400, improving safety of the automated driving system.

In a similar manner as described in FIG. 3, a notification can be sent to a driver of the vehicle 200 to take control of one or more vehicle systems 118 in response to receiving some indication that the path planner 122 is not meeting the threshold performance level. If the computing device 100 receives an indication that the driver of the vehicle 200 has taken control of the one or more vehicle systems 118 to operate the vehicle 200 in response to receiving the notification that the path planner 122 is not meeting the threshold performance level, the CPU 102 can be configured to disable the automated driving system. If no indication has been received that the driver has taken over control of various vehicle systems 118 within a threshold amount of time, existing vehicle safety protocols can be implemented as described above. In the FIG. 4 example, if the driver does not intervene within a threshold time, an adaptive cruise control system can be used to maintain the trajectory of vehicle 200 along the projected vehicle path 430 at a safe spacing from vehicle 416 in lane 404.

Figure 5:
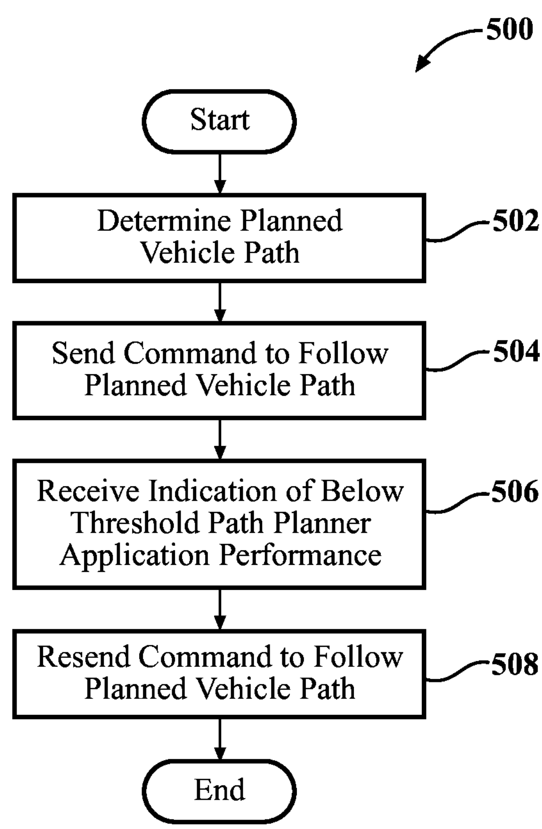
FIG. 5 is a logic flowchart of a process performed by the automated driving system.

FIG. 5 is a logic flowchart of a process 500 performed by the automated driving system. In step 502 of the process 500, the automated driving system can determine, using a path planner application such as path planner 122, a planned vehicle path, such as planned vehicle path 300 as shown in FIG. 3 or planned vehicle path 400 as shown in FIG. 4. The determination of the planned vehicle path can be based on analysis of the navigation route for the vehicle 200 and/or analysis of information specific to the environment surrounding the vehicle, such as proximate object information and lane information as described above.

In step 504 of the process 500, the automated driving system can send a command to one or more vehicle systems, such as the vehicle systems 118 shown in FIG. 1, to control the vehicle 200 to follow the planned vehicle path. As described above, the path planner 122 can communicate with a vehicle controller 124 which in turn communicates with various vehicle systems 118 to implement various vehicle maneuvers that allow the vehicle 200 to follow the planned vehicle path provided by the path planner 122, for example, planned vehicle paths 300, 400 shown in FIGS. 3 and 4.

In step 506 of the process 500, the automated driving system can receive an indication that the path planner application, e.g. path planner 122, is not meeting a threshold performance level as the vehicle 200 follows the planned vehicle path. As described above, determining whether the path planner application meets a threshold performance level can include determining whether the path planner application meets a predetermined accuracy score for calculations performed by the path planner application. In one example, the accuracy score can be computed based on the amount of processing time required by the path planner application to calculate the planned vehicle path. If the processing time is longer than one of a threshold, predetermined, or normally expected amount of time for the calculations to be completed, a low accuracy score can be given. A low accuracy score is one that is not associated with safe operation of the automated driving system. The automated driving system relies on efficient operation of the path planner application in order to maintain safe operation of the vehicle 200 along the navigation route.

In step 508 of the process 500, the automated driving system can resend the command to the one or more vehicle systems 118 to control the vehicle 200 to follow the planned vehicle path after receiving an indication that the path planner application is not meeting the threshold performance level. By resending a previous command from the path planner application instead of automatically deactivating the automated driving system, the vehicle 200 can continue to operate in a manner closely consistent with the original planned vehicle path. For example, as shown in FIG. 3, the vehicle 200 can be controlled to travel along projected vehicle path 324 instead of projected vehicle path 322 by implementing a resend of a previous command instead of automatic deactivation of the automated driving system upon indication that the path planner application is not meeting the threshold performance level. After step 508, the process 500 can end.

Alternatively, the process 500 could continue, and in addition to resending a previous command from the path planner application in order to maintain the position of vehicle 200 in close proximity to a previously planned vehicle path, the automated driving system can be configured to send a notification to a driver of the vehicle 200 to take control of one or more vehicle systems 118. The vehicle systems 118 to be controlled can include, for example, the steering system, the suspension system, the braking system, etc. The notification can be an audible warning, a tactile warning, or a visual warning, for example. If an indication is received by the automated driving system that the driver has intervened to take over control of the one or more vehicle systems 118, the automated driving system can be disabled, allowing manual operation of the vehicle 200 by the driver. In no indication is received by the automated driving system that the driver has intervened to take over control of the one or more vehicle systems 118 within a predetermined threshold time of the notification, a command can be sent to the one or more vehicle systems 118 to control the vehicle 200 according to vehicle safety protocols, as described above in reference to FIGS. 3 and 4. After these steps, the process 500 can end.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle 200 is generally described as an automobile. However, the vehicle 200 is not limited to an automobile, as the automated driving system could also be implemented with other vehicles generally controlled by a driver, or operator, such as airplanes, boats, etc. The scope of the claims is to be accorded the broadest interpretation so as to encompass all such modifications and equivalent structures as is permitted under the law.

What is claimed is:

1. An automated driving system, comprising:
one or more sensors disposed on a vehicle; and
a computing device in communication with the one or more sensors, comprising:
one or more processors for controlling the operations of the computing device; and
a memory for storing data and program instructions used by the one or more processors, wherein the one or more processors are configured to execute instructions stored in the memory to:
determine, using a path planner application receiving information based on inputs to the one or more sensors, a planned vehicle path;
send a command to one or more vehicle systems to control the vehicle to follow the planned vehicle path;
while the vehicle follows the planned vehicle path, receive an indication that the path planner application is not meeting a threshold performance level; and
after receiving the indication that the path planner application is not meeting the threshold performance level, resend the command to the one or more vehicle systems to control the vehicle to follow the planned vehicle path.

2. The system of claim 1, wherein the one or more processors are further configured to:
after receiving the indication that the path planner application is not meeting the threshold performance level, send a notification to a driver of the vehicle to take control of the one of more vehicle systems.

3. The system of claim 2, wherein the notification includes at least one of an audible warning, a tactile warning, and visual warning.

4. The system of claim 2, wherein the one or more processors are further configured to:
after reaching a threshold time after sending the notification to the driver of the vehicle to take control of the one or more vehicle systems, send a command to the one or more vehicle systems to control the vehicle according to vehicle safety protocols.

5. The system of claim 2, wherein the one or more processors are further configured to:
after sending the notification to the driver of the vehicle to take control of the one or more vehicle systems, receive an indication that the driver of the vehicle has taken control of the one or more vehicle systems; and
in response to the indication that the driver of the vehicle has taken control of the one or more vehicle systems, disable the automated driving system.

6. The system of claim 1, wherein determining the planned vehicle path includes at least one of analyzing a navigation route of the vehicle and analyzing information specific to the environment surrounding a vehicle.

7. The system of claim 6, wherein the information specific to the environment surrounding the vehicle includes at least one of proximate object information and lane information.

8. The system of claim 1, wherein the threshold performance level is based on meeting at least a predetermined accuracy score for calculations performed by the path planner application.

9. A computer-implemented method of automated driving, comprising:

determining, using a path planner application receiving information based on inputs to one or more sensors disposed on a vehicle, a planned vehicle path;

sending a command to one or more vehicle systems to control the vehicle to follow the planned vehicle path;

while the vehicle follows the planned vehicle path, receiving an indication that the path planner application is not meeting a threshold performance level; and after receiving the indication that the path planner application is not meeting the threshold performance level, resending the command to the one or more vehicle systems to control the vehicle to follow the planned vehicle path.

10. The method of claim 9, further comprising:

after receiving the indication that the path planner application is not meeting the threshold performance level, sending a notification to a driver of the vehicle to take control of the one of more vehicle systems, wherein the notification includes at least one of an audible warning, a tactile warning, and visual warning.

11. The method of claim 10, further comprising:

after reaching a threshold time after sending the notification to the driver of the vehicle to take control of the one or more vehicle systems, sending a command to the one or more vehicle systems to control the vehicle according to vehicle safety protocols.

12. The method of claim 10, further comprising:

after sending the notification to the driver of the vehicle to take control of the one or more vehicle systems, receiving an indication that the driver of the vehicle has taken control of the one or more vehicle systems; and in response to the indication that the driver of the vehicle has taken control of the one or more vehicle systems, disabling the automated driving system.

13. The method of claim 9, wherein determining the planned vehicle path includes at least one of analyzing a navigation route of the vehicle and analyzing information specific to the environment surrounding a vehicle, wherein the information specific to the environment surrounding the vehicle includes at least one of proximate object information and lane information.

14. The method of claim 9, wherein the threshold performance level is based on meeting at least a predetermined accuracy score for calculations performed by the path planner application.

15. A computing device, comprising:

one or more processors for controlling the operations of the computing device; and a memory for storing data and program instructions used by the one or more processors, wherein the one or more processors are configured to execute instructions stored in the memory to:

determine, using a path planner application receiving information based on inputs to one or more sensors disposed on a vehicle, a planned vehicle path;

send a command to one or more vehicle systems to control the vehicle to follow the planned vehicle path;

while the vehicle follows the planned vehicle path, receive an indication that the path planner application is not meeting a threshold performance level; and after receiving the indication that the path planner application is not meeting the threshold performance level, resend the command to the one or more vehicle systems to control the vehicle to follow the planned vehicle path.

16. The device of claim 15, wherein the one or more processors are further configured to:

after receiving the indication that the path planner application is not meeting the threshold performance level, send a notification to a driver of the vehicle to take control of the one of more vehicle systems, wherein the notification includes at least one of an audible warning, a tactile warning, and visual warning.

17. The device of claim 16, wherein the one or more processors are further configured to:

after reaching a threshold time after sending the notification to the driver of the vehicle to take control of the one or more vehicle systems, send a command to the one or more vehicle systems to control the vehicle according to vehicle safety protocols.

18. The device of claim 16, wherein the one or more processors are further configured to:

after sending the notification to the driver of the vehicle to take control of the one or more vehicle systems, receive an indication that the driver of the vehicle has taken control of the one or more vehicle systems; and in response to the indication that the driver of the vehicle has taken control of the one or more vehicle systems, disable the automated driving system.

19. The device of claim 15, wherein determining the planned vehicle path includes at least one of analyzing a navigation route of the vehicle and analyzing information specific to the environment surrounding a vehicle, wherein the information specific to the environment surrounding the vehicle includes at least one of proximate object information and lane information.

20. The device of claim 15, wherein the threshold performance level is based on meeting at least a predetermined accuracy score for calculations performed by the path planner application.

* * * * *